(12) United States Patent
Lili et al.

(10) Patent No.: US 10,787,351 B2
(45) Date of Patent: *Sep. 29, 2020

(54) PALLET TRUCK

(71) Applicant: Zhejiang E-P Equipment Co., Ltd., Hangzhou (CN)

(72) Inventors: Wu Lili, Hangzhou (CN); Huang Chao, Hangzhou (CN); Ma Qichen, Hangzhou (CN); Dai Jincai, Hangzhou (CN); Xu Nengzi, Hangzhou (CN)

(73) Assignee: ZHEJIANG E-P EQUIPMENT CO., LTD. (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,020

(22) Filed: Apr. 17, 2019

(65) Prior Publication Data
US 2019/0322508 A1    Oct. 24, 2019

(30) Foreign Application Priority Data

Apr. 19, 2018 (CN) .................... 2018 2 0566739 U

(51) Int. Cl.
*B62B 3/065* (2006.01)
*H01M 2/10* (2006.01)
(Continued)

(52) U.S. Cl.
CPC ........ *B66F 9/07531* (2013.01); *B62B 3/0618* (2013.01); *B62B 5/06* (2013.01);
(Continued)

(58) Field of Classification Search
CPC .............. B62B 5/0053; B62B 2301/04; B62B 2301/044; B62B 2301/05; B62B 2301/08; B62B 3/0618; B62B 3/0612; B66F 9/075; B66F 9/065; B66F 9/07531; H01M 2/1083; H01M 2220/20; H05K 5/0008; H05K 5/0026; H05K 5/0039; H05K 5/0065; H05K 5/0073; H05K 5/0256; H05K 5/0208; B60R 16/0239
See application file for complete search history.

(56) References Cited

U.S. PATENT DOCUMENTS

| 983,258 | A | * | 1/1911 | Bliss | ....................... | H01R 13/20 |
| | | | | | | 439/346 |
| 4,153,127 | A | * | 5/1979 | Klink | ....................... | H05K 7/18 |
| | | | | | | 180/65.1 |

(Continued)

FOREIGN PATENT DOCUMENTS

| CN | 203807075 U | * | 9/2014 |
| CN | 105174140 A | * | 12/2015 |

(Continued)

*Primary Examiner* — Steve Clemmons
*Assistant Examiner* — James A Shriver, II
(74) *Attorney, Agent, or Firm* — Cook Alex Ltd.

(57) ABSTRACT

A pallet truck includes a front frame having at least one fork and being connected to a drive unit through a lift cylinder, a plug-in battery assembly, a hydraulic supply system and a plug-in controller assembly connected to the front frame, and an operator handle connected to the drive unit. The pallet truck may include a rear frame having caster wheel assemblies that are mounted from above, and where the rear frame is connected to the drive unit.

17 Claims, 4 Drawing Sheets

(51) Int. Cl.
*B66F 9/075* (2006.01)
*B62B 3/06* (2006.01)
*B62B 5/06* (2006.01)
*B66F 9/065* (2006.01)
*H01M 10/052* (2010.01)

(52) U.S. Cl.
CPC .............. *B66F 9/065* (2013.01); *B66F 9/075* (2013.01); *H01M 2/1083* (2013.01); *H01M 10/052* (2013.01); *B62B 2301/04* (2013.01); *H01M 2220/20* (2013.01)

(56) References Cited

U.S. PATENT DOCUMENTS

| | | | |
|---|---|---|---|
| 4,756,978 A | 7/1988 | Nitcher et al. | |
| 5,441,123 A * | 8/1995 | Beckley | B60K 1/04 180/68.5 |
| 6,466,431 B1 * | 10/2002 | Thomas | B60R 16/0239 180/65.1 |
| 7,207,405 B2 * | 4/2007 | Reid | B60K 1/04 180/65.31 |
| 7,719,227 B2 * | 5/2010 | Lamoreux | H01M 2/202 320/107 |
| 8,412,431 B2 | 4/2013 | Wetterer et al. | |
| 8,413,947 B2 * | 4/2013 | Chiang | B62M 6/90 248/553 |
| 8,919,472 B2 * | 12/2014 | Magens | B66F 9/065 180/68.5 |
| 9,421,963 B2 | 8/2016 | Wetterer et al. | |
| 9,475,513 B2 * | 10/2016 | Liu | B62B 3/0612 |
| 9,718,661 B1 | 8/2017 | Hoffman | |
| D801,616 S | 10/2017 | Qichen et al. | |
| 9,908,762 B1 | 3/2018 | Hongpeng et al. | |
| 9,966,712 B1 * | 5/2018 | Hongpeng | H01R 13/052 |
| 10,040,674 B2 * | 8/2018 | Xu | B66F 7/08 |
| 10,093,336 B2 * | 10/2018 | Pan | B62B 5/0043 |
| 10,538,422 B2 * | 1/2020 | Lijian | H05K 5/0008 |
| 2003/0035278 A1 * | 2/2003 | Lawlyes | B60R 16/0239 361/796 |
| 2007/0137904 A1 | 6/2007 | Rose et al. | |
| 2010/0025126 A1 | 2/2010 | Nakatsu et al. | |
| 2014/0195127 A1 | 7/2014 | Hoffman | |
| 2015/0102274 A1 | 4/2015 | He et al. | |
| 2015/0266543 A1 * | 9/2015 | Marioni | B62M 6/90 180/207.3 |
| 2018/0009643 A1 | 1/2018 | Hoffman | |
| 2018/0065837 A1 * | 3/2018 | Rusche | B66F 9/065 |
| 2019/0322509 A1 | 10/2019 | Jianming et al. | |

FOREIGN PATENT DOCUMENTS

| | | | | |
|---|---|---|---|---|
| EP | 2018989 A1 * | 1/2009 | .......... | B66F 9/07527 |
| EP | 2505544 A1 * | 10/2012 | .......... | B66F 9/07531 |
| WO | WO-2018006666 A1 * | 1/2018 | ................ | B66F 9/06 |
| WO | WO-2019075224 A1 * | 4/2019 | .......... | G06F 13/4095 |

* cited by examiner

PALLET TRUCK

CROSS-REFERENCE TO RELATED APPLICATION

This application claims priority to Chinese Patent Application No. 201820566739.2, filed Apr. 19, 2018, which is hereby incorporated by reference in its entirety.

TECHNICAL FIELD

The invention relates to a material handling equipment, and more particularly to pallet trucks having a plug-in controller assembly and/or plug-in battery assembly.

BACKGROUND

Pallet trucks are used as logistics equipment to carry goods. The forks of a manual pallet truck are inserted into holes of a pallet when used in a pallet handling station. A hydraulic system of a manual pallet truck is driven by manpower to cause the lifting and descending of cargo on a pallet, and the pallet handling operation is completed by manpower of the user pulling the pallet truck. A pallet truck is the most simple, effective and common loading and unloading material handling tool in pallet conveyance of a pallet handling station.

The introduction of powered pallet trucks reduced the extent of manpower required. But at present, there still are some problems with existing pallet trucks. First, the structure of a typical existing pallet truck is basically divided into front and rear frames connected by a lift cylinder. A battery box typically is located in front of the lift cylinder, and a controller and hydraulic supply system are located behind the battery box. The size of the whole vehicle is relatively large, the turning radius is large, the width of an aisle required for passage is large, and as such, the use is limited.

Second, in the existing technology, lithium batteries with small size and light weight bring more convenience to material handling trucks. However, most batteries require some disassembly of the pallet truck to be removed from the pallet truck, which is inconvenient and can be time consuming with respect to operations and charging.

Third, the controller of an existing pallet truck is fixedly connected to the equipment, typically covered by a body panel and the equipment needs to be disassembled to be repaired and/or replaced when a failure occurs. At that time, the vehicle cannot be used, which greatly affects the timely and efficient use of the equipment.

Fourth, most existing material handling vehicles are equipped with two auxiliary caster wheels, and the caster wheels are accessed from below the vehicle, so they may be installed and disassembled only after lifting the entire vehicle, which results in the process of replacement of caster wheels being somewhat cumbersome and unsafe.

SUMMARY

The purpose of this disclosure is to provide a pallet truck that may be smaller and more convenient for installation and maintenance of service related items.

In order to achieve the above purpose, the disclosure provides a pallet truck having a front frame connected to a drive unit through a hydraulic lift cylinder. A hydraulic supply system, a controller assembly and a battery assembly are installed side by side on the front frame, and the battery assembly is located on one side of the lift cylinder. The hydraulic supply system and the controller assembly are located on the other side of the lift cylinder. The battery assembly and the controller assembly are connected to the front frame and configured to be of a plug-in and pull-out type. An operation handle is arranged on the drive unit, and the front frame also is provided with front forks.

In a preferred configuration, the battery assembly includes a battery box that encloses a power source such as a lithium battery, and has a battery cable female plug-in header and a battery signal line female plug-in header, which plugs into a battery base that includes a battery cable male plug-in header and a battery signal line male plug-in header. The lithium battery is fixed in the battery box. The bottom of the battery box is provided with an upward raised hollow guide column, and the upper end of the hollow guide column is provided with the battery cable female plug-in header and the battery signal line female plug-in header. The position of the hollow guide column corresponds to an upward raised guide block on the battery base. Fixed to the upper end of the guide block are the battery cable male plug-in header and the battery signal line male plug-in header. When the battery box is plugged into the battery base, the hollow guide column of the battery box receives the guide block of the battery base and the battery cable female plug-in header and the battery signal line female plug-in header receive and are connected to the battery cable male plug-in header and a battery signal line male plug-in header, respectively.

In a preferred embodiment, the battery box may be formed by fixing a battery top and battery bottom to a battery sidewall, such as by at least one screw respectively. The lithium battery is fixed on the battery bottom, and the hollow guide column is located at a corner of the battery bottom.

Also, in the preferred embodiment, a first battery plug-in bracket is fixed to the upper end of the hollow guide column, and the battery cable female plug-in header and the battery signal line female plug-in header are fixed in the first battery plug-in bracket, such as by at least one screw, respectively. In addition, a battery cable pin assembly and a battery signal line pin assembly are respectively fixed, such as by a least one screw, to the battery cable female plug-in header and the battery signal line female plug-in header.

In the preferred embodiment, fixed to an upper end of the guide block is a second battery plug-in bracket. A battery cable male plug-in header and a battery signal line male plug-in header are fixed in the second battery plug-in bracket at the upper end of the guide block, such as by at least one screw, respectively. Also, a battery cable plug-in pin assembly and a battery signal line plug-in pin assembly are respectively fixed, such as by at least one screw, to the battery cable male plug-in header and the battery signal line male plug-in header.

Also, in the preferred embodiment, the hollow guide column has a height and the guide block has a height that is substantially the same as the height of the hollow guide column, and the battery sidewall has a height and the height of the hollow guide column is greater than two-thirds of the height of the battery sidewall. The use of a tall hollow guide column and guide block help to stabilize and prevent the plug-in battery assembly from loosening due to encountering bumps or vibrations during the use or transportation of the pallet truck.

In the preferred embodiment, the battery assembly includes a handle, a switch and a light emitting diode (LED) lamp respectively mounted on the battery top, with the lamp providing temporary lighting. A battery management system (BMS) module is fixed on the battery bottom. The second plug-in battery bracket also is provided with a clamp having two prongs that engage and releasably retain the first plug-in bracket for the plug-and-pull function of the battery box relative to the battery base.

Additionally, in the preferred embodiment, the controller assembly includes a controller box that encloses a control unit and plugs into a controller base. The control unit is fixed in the controller box, such as by at least one screw, and the lower end of the controller box is provided with a receptacle. The internal top of the receptacle is provided with a controller plug-in bracket, to which is connected a controller cable female plug-in header and a controller signal line female plug-in header. An upper part of the controller base includes a raised socket. The controller box and the controller base are connected when the receptacle of the controller box receives the raised socket of the controller base, which causes the connection of the controller cable female plug-in header to a controller cable male plug-in header and connection of the controller signal line female plug-in header with a controller signal line male plug-in header. When there is a fault in the control unit, the maintenance of the equipment can be completed by simply pulling out and replacing the controller box, which improves the maintenance efficiency and the use efficiency of the equipment.

In the preferred embodiment, the controller box is formed by fixing a back cover to a front cover, such as by at least one screw, and the control unit is fixed on the back cover, such as by at least one screw.

Also, in the preferred embodiment, the internal top of the receptacle is provided with a controller plug-in bracket, which is fixed to the back cover and to the front cover of the controller box, such as by at least one screw, respectively.

In the preferred embodiment, the controller base is provided with a clamp having two prongs that engage and releasably retain the controller plug-in bracket on the controller base, and a controller cable plug-in pin assembly is fixed, such as by at least one screw, to a controller cable male plug-in header and a controller signal line plug-in pin assembly is fixed, such as by at least one screw, to a controller signal line male plug-in header.

Also, in the preferred embodiment, the rear frame includes a pair of caster wheel assemblies. Inner sides of both ends of the rear frame are fixed to mounting brackets, which are connected to the drive unit, respectively. Each mounting bracket is provided with an opening. A lower face of a fixing plate at the top of a caster wheel assembly is fixed to an upper face of the mounting bracket, such as by at least one screw. By adjusting the installation direction of the caster wheel, the caster wheel can be removed from above, so that the pallet truck does not need to be hoisted to disassemble and install a new caster wheel assembly. The structure makes the assembly and disassembly of caster wheel assemblies simpler and safer, and can be completed without other auxiliary work, thus making the maintenance more simple and convenient.

In the preferred embodiment, an outer side of the mounting bracket is vertically fixed to the rear frame, the inner side of the mounting bracket is folded upward to form a connecting side plate, the two sides of the drive unit are fixed to the respective two connecting side plates, such as by at least one screw, respectively, and the opening in the mounting plate extends to the connecting side plate.

The preferred embodiment also includes a lock washer and a flat washer between the screw and the fixing plate at the top of the caster wheel assembly, and the rear frame forms an arc-shaped connection plate as a whole.

The disclosure adjusts the layout of the pallet truck, divides the battery assembly, to be located on one side of the lift cylinder, and the hydraulic supply system and controller assembly, to be located on the other side of the lift cylinder. This reduces the size of the vehicle, the turning radius and the width required for aisle passage, and facilitates use of such pallet trucks in more environments. The controller assembly and the battery assembly are configured for plug-in and pull-out connection to the pallet truck, which facilitates disassembly, assembly and maintenance.

DETAILED DESCRIPTION OF THE PREFERRED EMBODIMENT

Figure 1:
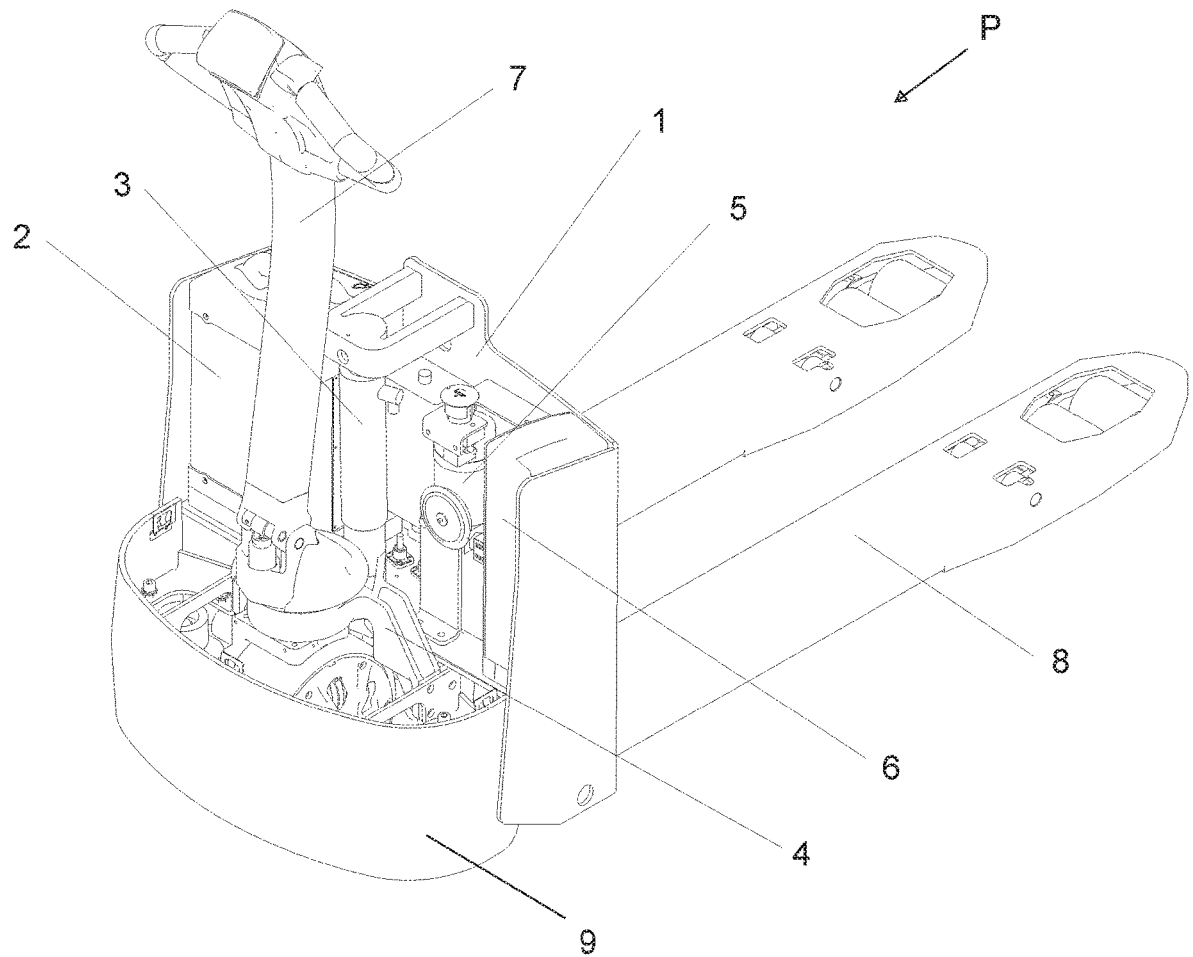
FIG. 1 is a schematic diagram of a pallet truck in accordance with the present disclosure.

An embodiment of a pallet truck is described in detail below, and an example of the embodiment is shown in the drawings in which identical or similar labels throughout represent identical or similar elements, or elements with the same or similar functions. The following embodiments described with reference to the drawings are illustrative and are intended to be used to explain, rather than to limit the disclosure.

An example pallet truck P is shown in FIGS. 1-4, with some structure removed for convenience of viewing. The pallet truck P has a front frame 1 connected to a drive unit 4 through a hydraulic lift cylinder 3. A hydraulic supply system 5, a controller assembly 6 and a battery assembly 2 are installed side by side on the front frame 1. The battery assembly 2 is located on one side of the lift cylinder 3, and the hydraulic supply system 5 and the controller assembly 6 are located on the other side of the lift cylinder 3. The battery assembly 2 and the controller assembly 6 are connected to the front frame 1 and configured to be of a plug-in and pull-out type. An operation handle 7 is arranged on the drive unit 4, and the front frame 1 also is provided with front forks 8, and the pallet truck P may include a rear frame 9 connected to an extending outward from the drive unit 4.

Figure 2:
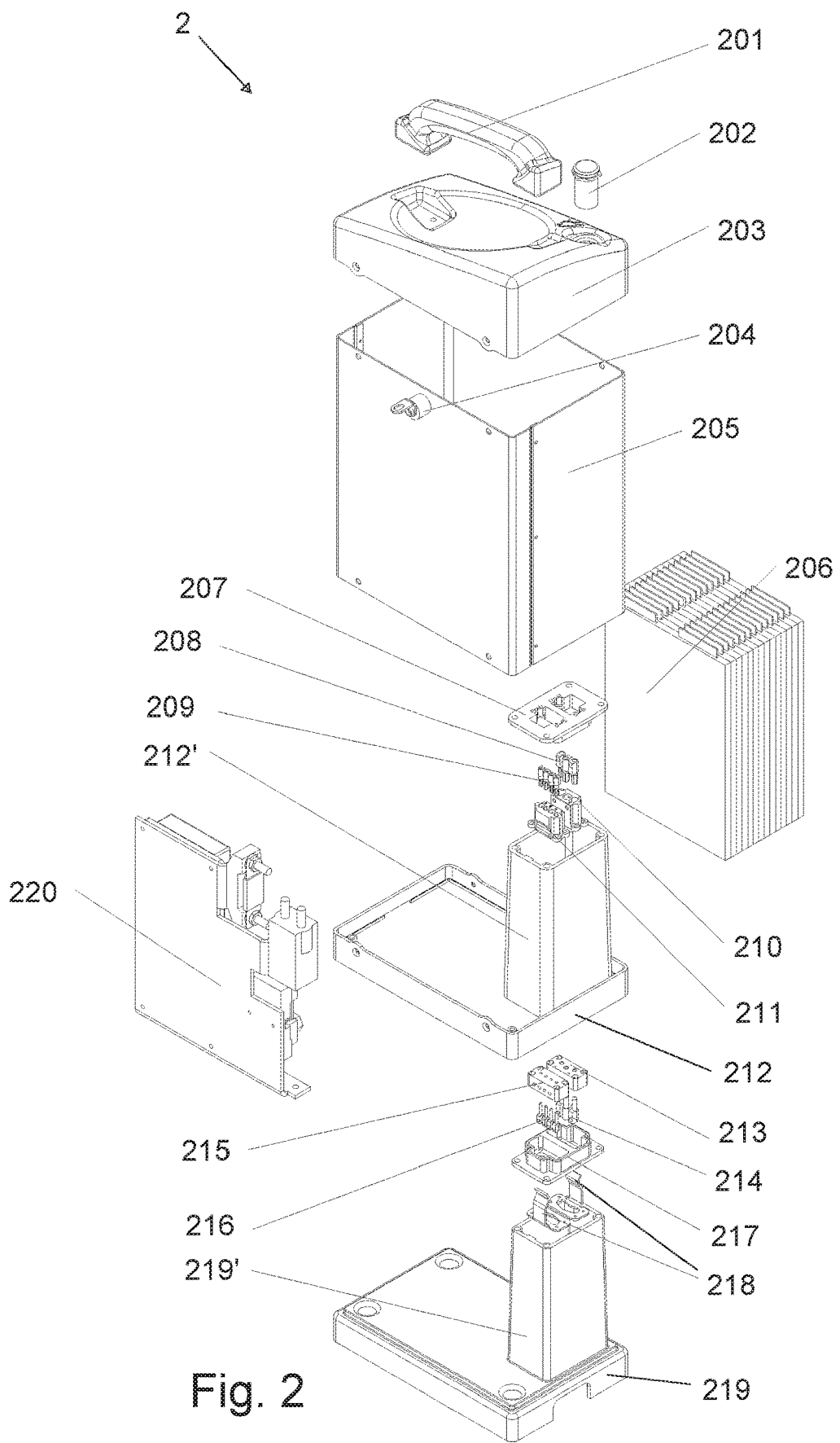
FIG. 2 is a schematic diagram of a plug-in battery assembly of a pallet truck in accordance with the present disclosure.

As shown in FIG. 2, the battery assembly 2 includes a battery box that encloses a power source, such as a lithium battery 206, and plugs into a battery base 219, which is configured to be mounted to the front frame 1 of the pallet truck P. The battery box includes a battery cable female plug-in header 210 and a battery signal line female plug-in header 211. The battery box is fixedly assembled, such as by screws that connect a battery top 203 and a battery bottom 212 to a battery sidewall 205. The lithium battery 206 is fixed in the battery box on the battery bottom 212, and the battery bottom 212 is provided with an upward raised hollow guide column 212'. The hollow guide column 212' is located at one corner of the battery bottom 212. The battery assembly 2 also may include a handle 201, a switch 202 and a light emitting diode (LED) lamp 204 mounted on the top cover 203 of the battery assembly 2, respectively. A battery management system (BMS) module 220 is fixed on the battery bottom 212.

A first battery plug-in bracket 207 is fixed to the upper end of the hollow guide column 212', and the battery cable female plug-in header 210 and the battery signal line female plug-in header 211 are fixed in the first battery plug-in bracket 207, such as by at least one screw, respectively. In addition, a battery cable pin assembly 208 and a battery signal line pin assembly 209 are respectively fixed, such as by a least one screw, to the battery cable female plug-in header 210 and the battery signal line female plug-in header 211.

The position of the hollow guide column 212' corresponds to an upward raised guide block 219' on a battery base 219. Fixed to an upper end of the guide block 219' is a second battery plug-in bracket 217. A battery cable male plug-in header 213 and a battery signal line male plug-in header 215 are fixed in the second battery plug-in bracket 217 at the upper end of the guide block 219', such as by at least one screw, respectively. Also, a battery cable plug-in pin assembly 214 and a battery signal line plug-in pin assembly 216 are respectively fixed, such as by at least one screw, to the battery cable male plug-in header 213 and the battery signal line male plug-in header 215.

The upper end of the raised guide block 219' is provided with the battery cable male plug-in header 213 and the battery signal line male plug-in header 215. The battery box may be plugged into the battery base 219, which makes the connection of the battery box with the guide block 219' via the hollow guide column 212'. Thus, with the battery assembly 2, a user may plug-in the battery box to the battery base 219, which causes the battery cable female plug-in header 210 and its battery cable pin assembly 208 to receive and connect to the battery cable male plug-in header 213 and its battery cable plug-in pin assembly 214, and causes the battery signal line female plug-in header 211 and its battery signal line pin assembly 209 to receive and connect to the battery signal line male plug-in header 215 and its battery signal line plug-in pin assembly 216.

In this example, the hollow guide column 212' has a height and the guide block 219' has a height that is substantially the same as the height of the hollow guide column 212'. Also, the battery sidewall 205 has a height and the height of the hollow guide column 212' is greater than two-thirds of the height of the battery sidewall 205. This helps stabilize the connection, which also is aided by having the second battery plug-in bracket 217 be provided with a releasable clamp 218 having two prongs that engage and releasably retain the first plug in bracket 207 when the battery box is plugged into the battery base 219. It will be appreciated that in light of the above structures, a user may quickly and conveniently pull-out the battery box from the battery base 219, if for instance, the battery needs to be serviced or replaced, without having to disassemble any of the rest of the pallet truck P.

Figure 3:
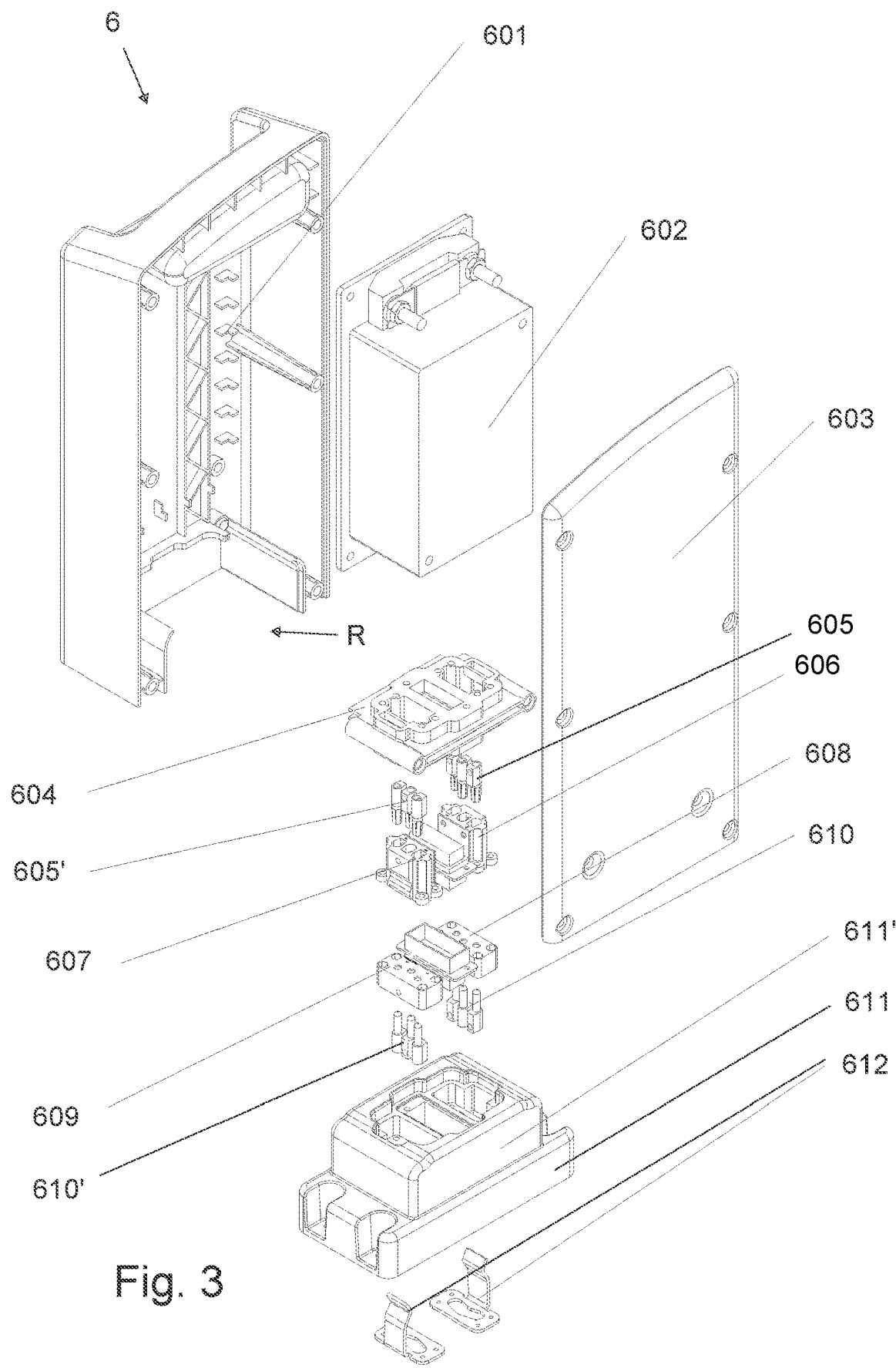
FIG. 3 is a schematic diagram of a plug-in controller assembly of a pallet truck in accordance with the present disclosure.

As shown in FIG. 3, the controller assembly 6 includes a controller box that encloses a control unit 602 and plugs into a controller base 611. The controller box is formed by a back cover 601 and a front cover 603 being fixedly connected, such as by at least one screw, and the control unit 602 is enclosed in the controller box and may be fixed to the back cover 601, such as by at least one screw. A lower end of the controller box is provided with a receptacle R that that receives the controller base 611. The controller base 611 is configured to be mounted on the front frame 1 of the pallet truck P. The internal top of the receptacle R is provided with a controller plug-in bracket 604, which is fixed to the back cover 601 and to the front cover 603 of the controller box, such as by at least one screw, respectively. A controller cable female plug-in header 606 is fixed, such as by at least one screw, to a controller cable pin assembly 605, and a controller signal line female plug-in header 607 is fixed, such as by at least one screw, to a controller signal line pin assembly 605'.

An upper part of the controller base 611 includes a raised socket 611'. A controller cable male plug-in header 608 and a controller signal line male plug-in header 609 are arranged in the socket 611' of the controller base 611. Also, a controller cable plug-in pin assembly 610 is fixed, such as by at least one screw, to the controller cable male plug-in header 608, while the controller signal line plug-in pin assembly 610' is fixed, such as by at least one screw, to the controller signal line male plug-in header 609. Thus, with the controller assembly 6, a user may plug-in the controller box to the controller base 611, which causes the socket 611' of the controller base on the front frame 1 of the pallet truck P to be received by the receptacle R in the bottom of the controller box, and causes the controller cable female plug-in header 606 and its controller cable pin assembly 605 to receive and connect to the controller cable male plug-in header 608 and its controller cable plug-in pin assembly 610, and causes the controller signal line female plug-in header 607 and its controller signal line pin assembly 605' to receive and connect to the controller signal line male plug-in header 609 and its controller signal line plug-in pin assembly 610'.

The controller base 611 also is provided with a clamp 612 having two prongs that engage and releasably retain the controller plug-in bracket 604 when the controller box is plugged-in and the receptacle R receives the raised socket 611' of the controller base 611. It will be appreciated that in light of the above structures, a user also may quickly and conveniently pull-out the controller box from the controller base 611, if for instance, the controller box needs to be serviced or replaced, without having to disassemble any of the rest of the pallet truck P.

Figure 4:
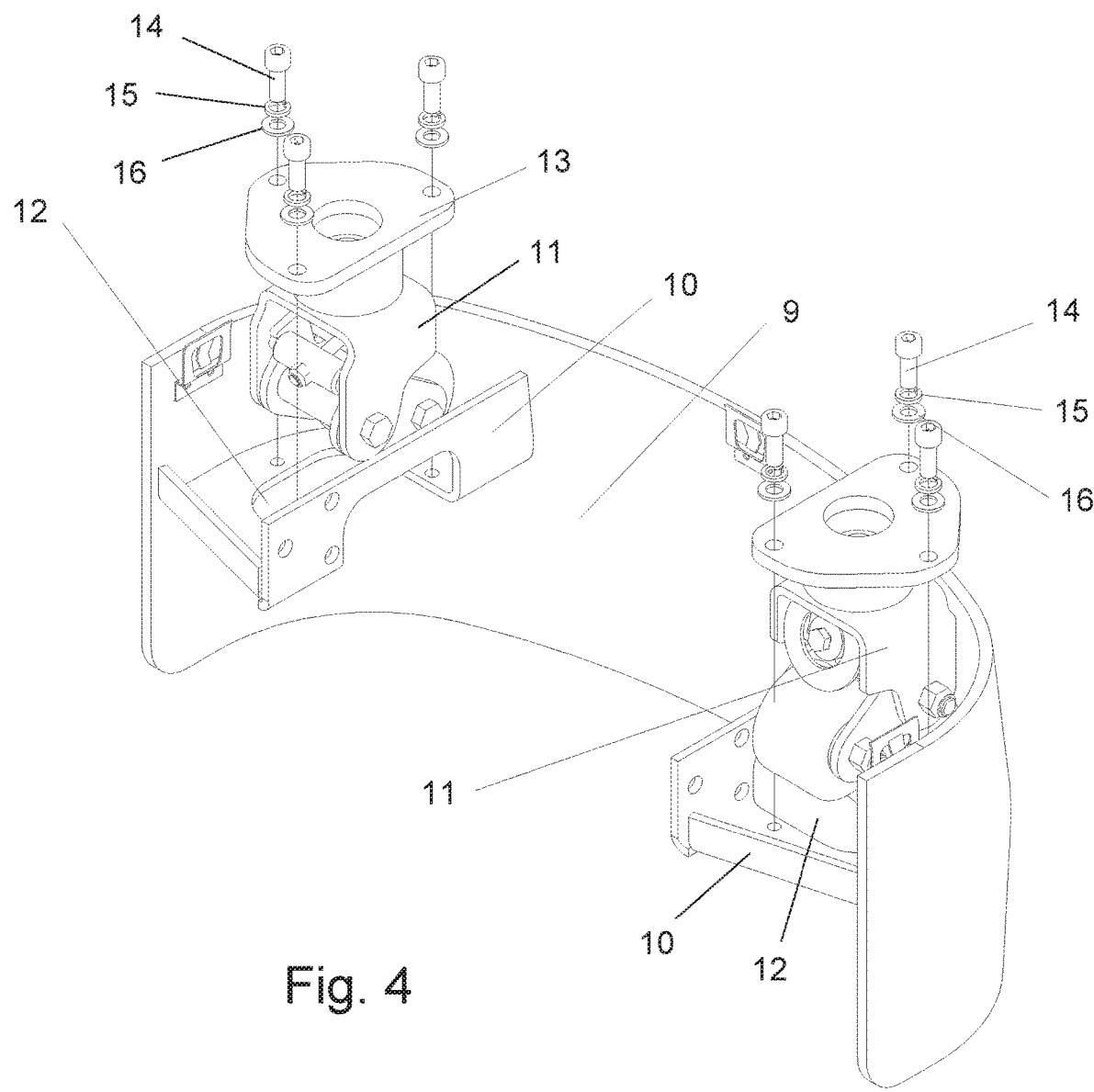
FIG. 4 is a schematic diagram of a rear frame and caster wheel assemblies of a pallet truck in accordance with the present disclosure.

FIG. 4 shows a rear frame 9 of the pallet truck P, which includes a pair of caster wheels. The inner sides of both ends of the rear frame 9 are fixed to mounting brackets 10 which are connected to the drive unit 4, respectively. Each mounting bracket 10 is provided with an opening 12. A lower face of a fixing plate 13 at the top of a caster wheel assembly 11 is fixed to an upper face of the mounting bracket 10 proximate the respective opening 12, such as by at least one screw 14.

The outer side of the mounting bracket 10 is vertically fixed to the rear frame 9, and the inner side of the mounting bracket 10 is folded upward to form a connecting side plate. The two sides of the drive unit 4 are fixed to the respective two connecting side plates, such as by at least one screw, and the opening 12 extends to the connecting side plate. A lock washer 15 and a flat washer 16 also are arranged between the screw 14 and the fixing plate 13 at the top of each caster wheel assembly 11, and the rear frame 9 forms an arc-shaped connection plate as a whole. Having the fixing plates 13 of the caster wheel assemblies 11 mount downward against the upper surface of the mounting brackets 10 advantageously permits disassembly and installation of the caster wheels assemblies 11 without the cumbersome and potentially dangerous need to lift the pallet truck P.

It should be noted that the above embodiments are only representative examples of the pallet truck of the present disclosure which may have many different configurations. Any equivalent to or modification of the above embodiments according to the essence of the disclosure shall be considered to be within the scope of the disclosure.

The invention claimed is:

1. A pallet truck, comprising:
a front frame having at least one fork and being connected to a drive unit through a lift cylinder;
an operator handle connected to the drive unit;
a plug-in battery assembly, a hydraulic supply system and a plug-in controller assembly connected to the front frame;
wherein the plug-in battery assembly further comprises a power source in a battery box, and a battery base, with the battery base being fixed to the front frame and the battery box being configured to plug-in and pull-out from the battery base;
wherein the front frame includes walls that extend vertically and define an upper opening, with the battery box being movable directly vertically through the upper opening and along the walls that extend vertically;
wherein the battery box further comprises a battery top and a battery bottom that are connected to a battery sidewall, and the power source is fixed to the battery bottom and is enclosed by the battery box;
wherein the battery box further comprises a battery cable female plug-in header and a battery signal line female plug-in header and the battery base further comprises a battery cable male plug-in header and a battery signal line male plug-in header;
wherein the battery bottom of the battery box further comprises an upward raised hollow guide column to which the battery cable female plug-in header and battery signal line female plug-in header are connected, and the battery base further comprises an upward raised guide block to which the battery cable male plug-in header and battery signal line male plug-in header are connected; and
wherein the upward raised hollow guide column on the battery bottom of the battery box has a height and the upward raised guide block on the battery base has a height that is substantially the same as the height of the upward raised hollow guide column, and wherein the battery sidewall has a height and the height of the upward raised hollow guide column on the battery bottom of the battery box is greater than two-thirds of the height of the battery sidewall.

2. The pallet truck in accordance with claim 1, wherein on the front frame the plug-in battery assembly is located to one side of the lift cylinder and the hydraulic supply system and plug-in controller are located to the opposite side of the lift cylinder.

3. The pallet truck in accordance with claim 1, wherein the power source is a lithium battery.

4. The pallet truck in accordance with claim 1, wherein when the battery box is plugged into the battery base, the upward raised hollow guide column of the battery box receives the upward raised guide block of the battery base and the battery cable male plug-in header and battery signal line male plug-in header are connected to the respective battery cable female plug-in header and battery signal line female plug-in header.

5. The pallet truck in accordance with claim 1, wherein the upward raised hollow guide column is located at a corner of the battery bottom of the battery box.

6. The pallet truck in accordance with claim 1, wherein a first battery plug-in bracket is fixed to the upper end of the upward raised hollow guide column and the battery cable female plug-in header and battery signal line female plug-in header are fixed to the first battery plug-in bracket.

7. The pallet truck in accordance with claim 6, wherein a second battery plug-in bracket is fixed to the upper end of the upward raised guide post on the battery base and the battery cable male plug-in header and battery signal line male plug-in header are fixed to the second battery plug-in bracket.

8. The pallet truck in accordance with claim 7, wherein the second battery plug-in bracket further comprises a clamp that engages and releasably retains the first battery plug-in bracket when the battery box is plugged into the battery base.

9. The pallet truck in accordance with claim 1, wherein a battery cable pin assembly and battery signal line pin assembly are fixed to the battery cable female plug-in header and battery signal line female plug-in header, respectively, and wherein a battery cable plug-in pin assembly and battery signal line plug-in pin assembly are fixed to the battery cable male plug-in header and battery signal line male plug-in header, respectively.

10. The pallet truck in accordance with claim 9, wherein when the battery box is plugged into the battery base, the battery cable female plug-in header and its battery cable pin assembly receive and are connected to the battery cable male plug-in header and its battery cable plug-in pin assembly, and the battery signal line female plug-in header and its battery signal line pin assembly receive and are connected to and the battery signal line male plug-in header and its battery signal line plug-in pin assembly.

11. The pallet truck in accordance with claim 1, wherein the battery box further comprises a battery top and a handle, switch and lamp are connected to the battery top.

12. The pallet truck in accordance with claim 1, wherein the battery box further comprises a battery bottom and a battery management system module is connected to the battery bottom and enclosed by the battery box.

13. The pallet truck in accordance with claim 1, further comprising,
a rear frame;
two mounting plates fixed to the rear frame, extending inward and connected to opposed sides of the drive unit;
two caster wheel assemblies connected to the respective two mounting plates;
wherein each caster wheel assembly further comprises a fixing plate at an upper end of the caster wheel assembly and each mounting plate further comprises an opening therein;
wherein a lower face of the fixing plate at the upper end of each caster wheel assembly is fixed to an upper face of the respective mounting plate proximate the opening.

14. The pallet truck in accordance with claim 13, wherein each mounting plate fixed to the rear frame extends inward and includes an upward extending connecting side plate that is connected to the drive unit; and
the two mounting plates having openings therein and respective lower surfaces of the fixing plates of the two caster wheels engage respective upper surfaces of the two mounting plates, such that the caster wheel assemblies mount from above to the respective mounting plates.

15. A pallet truck, comprising:
a front frame having at least one fork and being connected to a drive unit through a lift cylinder;
a plug-in battery assembly, a hydraulic supply system and a plug-in controller assembly connected to the front frame;
an operator handle connected to the drive unit;
wherein the plug-in controller assembly further comprises a controller box, a control unit and a controller base;
the controller base being connected to the front frame of the pallet truck;
the controller box enclosing the control unit;
a lower end of the controller box having a receptacle and providing a controller cable plug-in header and a controller signal line plug-in header;
the controller base having a raised socket and providing a controller cable plug-in header and a controller signal line plug-in header; and
wherein when the controller box is plugged-into the controller base, the receptacle of the controller box receives the raised socket of the controller base and the controller cable plug-in header and the controller signal line plug-in header in the receptacle of the controller box engage and connect to the respective controller cable plug-in header and the controller signal line plug-in header in the raised socket of the controller base.

16. The pallet truck in accordance with claim 15, wherein the controller box further comprises a back cover connected to a front cover, and the control unit is connected to the back cover, and wherein a controller plug-in bracket is located at an internal top of the receptacle.

17. The pallet truck in accordance with claim 16, wherein the controller plug-in bracket is connected to the back cover and to the front cover of the controller box, and the controller base further comprises a clamp that engages and releasably retains the controller plug-in bracket in the receptacle of the controller box when the controller box is plugged into the controller base.

* * * * *